United States Patent
Buchholz et al.

(10) Patent No.: US 11,925,289 B2
(45) Date of Patent: Mar. 12, 2024

(54) METHOD FOR ADJUSTING THE DISPENSING TEMPERATURE OF A CAFFEINATED HOT BEVERAGE AND AUTOMATIC BEVERAGE MAKER FOR PREPARING A CAFFEINATED HOT BEVERAGE HAVING A SPECIFIED DISPENSING TEMPERATURE

(71) Applicant: MELITTA PROFESSIONAL COFFEE SOLUTIONS GMBH & CO. KG, Minden (DE)

(72) Inventors: Bernd Buchholz, Rahden (DE); Thomas Diester, Bückeburg (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 623 days.

(21) Appl. No.: 17/054,498

(22) PCT Filed: May 16, 2019

(86) PCT No.: PCT/EP2019/062581
§ 371 (c)(1),
(2) Date: Nov. 10, 2020

(87) PCT Pub. No.: WO2019/219798
PCT Pub. Date: Nov. 21, 2019

(65) Prior Publication Data
US 2021/0186258 A1    Jun. 24, 2021

(30) Foreign Application Priority Data

May 17, 2018  (DE) .................... 10 2018 111 881.3

(51) Int. Cl.
*A47J 31/52*   (2006.01)
*A23F 5/26*    (2006.01)
(Continued)

(52) U.S. Cl.
CPC .......... *A47J 31/5253* (2018.08); *A23F 5/262* (2013.01); *A47J 31/002* (2013.01); *A47J 31/56* (2013.01)

(58) Field of Classification Search
CPC ...... A47J 31/002; A47J 31/5253; A47J 31/52; A23F 5/262; A23F 5/26; A23F 5/24; A23F 3/18
See application file for complete search history.

(56) References Cited

U.S. PATENT DOCUMENTS

| | | | |
|---|---|---|---|
| 2011/0045152 A1* | 2/2011 | Stutz | A47J 31/50 426/433 |
| 2019/0053656 A1* | 2/2019 | Locher | A47J 31/542 |
| 2021/0052106 A1* | 2/2021 | Mckay | F25B 29/003 |

FOREIGN PATENT DOCUMENTS

| | | |
|---|---|---|
| DE | 102009033507 A1 | 1/2011 |
| DE | 102011076214 A1 | 11/2012 |

(Continued)

OTHER PUBLICATIONS

International Search Report in related International Patent Application No. PCT/EP2019/062581, dated Jul. 5, 2019, 5 pages with English translation.

(Continued)

*Primary Examiner* — Reginald Alexander
(74) *Attorney, Agent, or Firm* — FisherBroyles, LLP; Robert Kinberg (57) ABSTRACT

A method, and apparatus for implementing the method, for adjusting a dispensing temperature of a hot beverage by an automatic beverage maker. The temperature of the hot beverage and/or the water supplied to a brewing unit for producing the hot beverage is measured. The measured temperature is compared with a desired value and the temperature of the hot beverage is adjusted to the desired value by cooling. The hot beverage or the water supplied to (Continued)

the brewing unit for producing the hot beverage is cooled directly via a machine-controlled addition of cold water. The temperature is adapted to the desired value by an amount of cold water supplied by the machine-controlled addition of cold water. The temperature is adapted by a controllable metering valve that meters the amount of added cold water.

30 Claims, 6 Drawing Sheets

(51) Int. Cl.
*A47J 31/00* (2006.01)
*A47J 31/56* (2006.01)

(56) References Cited

FOREIGN PATENT DOCUMENTS

| | | |
|---|---|---|
| DE | 102014212645 A1 | 12/2015 |
| DE | 202015009436 U1 | 8/2017 |
| EP | 2238876 A2 | 10/2010 |
| EP | 2268175 B1 | 5/2013 |
| WO | 2015056241 A1 | 4/2015 |
| WO | 2015149899 A1 | 10/2015 |

OTHER PUBLICATIONS

German Search Report in related German Patent Application No. 10 2018 111 881.3, dated Jan. 15, 2019, 18 pages with English Translation.

\* cited by examiner

METHOD FOR ADJUSTING THE DISPENSING TEMPERATURE OF A CAFFEINATED HOT BEVERAGE AND AUTOMATIC BEVERAGE MAKER FOR PREPARING A CAFFEINATED HOT BEVERAGE HAVING A SPECIFIED DISPENSING TEMPERATURE

CROSS-REFERENCE TO RELATED APPLICATIONS

This application is a United States National Stage Application of International Application No. PCT/EP2019/062581 filed May 16, 2019, claiming priority from German Patent Application No. 10 2018 111 881.3 filed May 17, 2018.

FIELD OF THE INVENTION

The present invention relates to a method for adjusting the dispensing temperature of a hot beverage and an automatic beverage maker for preparing a hot beverage with a defined dispensing temperature.

BACKGROUND

Chilled hot beverages with a lower temperature than a brewing temperature are enjoying increasing popularity. The fully automatic production of this type of product is therefore of great interest both for automatic beverage makers for domestic use, e.g. coffee makers, and in particular for automatic beverage makers, especially so-called fully automatic coffee makers for commercial use in bars, cafés, bakeries and the like.

Conventional methods of cold extraction, such as Cold Drip or Cold Brew, are not practical for a fully automatic coffee maker due to the time required, and with the vast majority of known alternative systems or processes, such as disclosed in EP 2 268 175 B1, hot brewed coffee is cooled to a temperature below the brewing temperature exclusively indirectly through the use of heat exchangers.

The range of action of this procedure is severely limited by the dependence on ambient temperatures, coffee quantities, flow speeds and heat transfer surfaces, so that the coffee output temperature is only a result of these factors and cannot be individually produced and adjusted.

EP 2 238 876 A2 describes an automatic beverage maker with a device for the direct introduction of cold water into the coffee, wherein the cold water quantity is controlled by determining the concentration.

According to WO 2015/149899 A1, the coffee beverage is first cooled in a heat exchanger. Then cold water can be added to the coffee beverage flowing to the coffee spout via a controllable valve. The valve is controlled by determining the flow rate using a flow meter which can be positioned along the cold water supply lines.

DE 10 2011 076 214 A1 is mentioned as the generic prior art. A pump is used to add cold water, which results in a relatively poor controllability of the metering process.

SUMMARY OF THE INVENTION

Based on the aforementioned prior art, it is an object of the present invention to provide an improved, in particular simple and precise, method for adjusting the dispensing temperature of a hot beverage, such as a caffeinated hot beverage.

The present invention solves the above and other objects by provision of a method for adjusting a dispensing temperature of a hot beverage, such as a caffeinated beverage, by an automatic beverage maker as described below and by an automatic beverage maker which may be used for implementing the method as also described below Although the invention is described below in the context of preparing a caffeinated hot beverage, it is obvious that the invention is equally applicable to the preparations of a non-caffeinated hot beverage.

A method according to the invention is suitable for adjusting the dispensing temperature of a caffeinated hot beverage by an automatic beverage maker, preferably by a hot beverage maker, in particular by a fully automatic coffee maker. The method can optionally also be used for the preparation of the caffeinated hot beverage, since it comprises all essential preparation steps.

In particular, the hot beverage is a hot beverage containing coffee and/or espresso. The automatic beverage maker can also be designed as a so-called piston machine. The actual method then comprises at least the following steps:

In a first step, hot water is provided by a boiler. The water supplied is heated inside the boiler to temperatures preferably above 75° C., and especially preferably from 80° C. to 96° C. Water at this temperature is also referred to as hot water in this document.

In a further step, the caffeinated hot beverage is prepared by a brewing unit. The brewing unit is supplied with either hot water directly from the boiler or optionally with already cooled hot water, e.g. between 50° C. and 75° C.

In a further step, the temperature of the caffeinated hot beverage is measured. The measurement can preferably be carried out directly at the outlet of the brewing unit or preferably after the cold water has been added and especially after a further optional cooling, e.g. indirect aftercooling.

The measured temperature is then preferably compared with at least one desired value. This at least one desired value can be, for example, a predetermined value for the output temperature of the hot beverage to be achieved. However, the temperature to be achieved, in particular the dispensing temperature immediately before the caffeinated hot beverage is dispensed by a dispensing unit, i.e. after various cooling measures, can also be assumed as the desired value.

The temperature of the caffeinated hot beverage can then be controlled and/or regulated to adjust to the desired value by cooling. Cooling can include a machine-controlled first or further addition of cold water to the caffeinated hot beverage provided by the brewing unit. Alternatively, or additionally, the hot water supplied to the brewing unit can also be cooled by a machine-controlled cold water addition before it is fed into the brewing unit. In this respect, machine-controlled cold water addition means that it is controlled or regulated by the machine and is thus initiated, either by a pipe inside the machine through which the water for preparing the hot beverage flows or through which the already prepared hot beverage flows, or by a separate outlet directly into the vessel into which the prepared hot beverage is dispensed. In this case the temperature is adjusted to the desired value at least partially by means of a cold water quantity supplied by the cold water addition as a liquid medium by means of the machine-controlled cold water addition, wherein the adjustment or adaptation of the temperature is effected by metering (dosing) the cold water quantity, wherein a controllable metering valve is used for metering.

Compared to the prior art, this makes it possible to add precisely metered cold water from a tank or from a pipe or the like in a simple way, without a pump for cold water addition being absolutely necessary in the machine.

"At least partly" means in this context that for the adjustment of the temperature, in addition to the supply of cold water, further possibilities of cooling may be provided, e.g. by a heat exchanger within the scope of indirect aftercooling, or by pre-cooling the supplied cold water.

Recording the temperature of the cooled caffeinated hot beverage, but also of the metered cold water and a dosage of cold water enables an exact setting of the dispensed coffee temperature. This allows, among other things, individual recipes for hot beverages, which can be specifically adjusted to the user, the dispensing point or a chain of companies on site.

Automatic beverage makers in the sense of the present invention are both automatic beverage makers for domestic use, e.g. coffee makers, but also in particular automatic beverage makers, in particular so-called fully automatic coffee makers for commercial use in bars, cafés, bakeries and the like.

The automatic beverage maker may, in particular, include several data records comprising at least the dispensing quantity and the dispensing temperature as a function of a selected type of hot beverage. Thus, the quantity and the temperature can be prepared individually for each product by selecting the type of beverage.

This means that the same quantity is not always cooled to the same temperature, but rather the dispensed beverage can be produced individually for each product in order to maintain a particularly high product variety.

The temperature of the caffeinated hot beverage can be advantageously measured after the addition of cold water, wherein the amount of cold water supplied is controlled depending on this measuring signal. Thus, a very direct check and adjustment of the product temperature is achieved preferably immediately before its dispensing.

For the purposes of the present invention, a control and/or regulation as a function of individual measured variables is always to be understood in the sense that the aforementioned control and/or regulation can be carried out exclusively on the basis of this measured variable, but it is also possible that the control and/or regulation can be influenced by several measured variables, e.g. temperatures or flow rates. For example, with reference to the aforementioned temperature of the caffeinated hot beverage, the volume of the hot beverage can also be included in the control of the cold water quantity and, optionally, also in the temperature of the cold water when it is fed in as part of a pre-cooling of the cold water by measuring a volume and/or mass flow rate.

The caffeinated hot beverage can be prepared in the brewing unit, with cold water being supplied after the brewing unit. The brewing speed is known to be dependent on the temperature. It is therefore advisable to brew a large number of beverages at a brewing temperature of over 75° C. and only then to cool them down by supplying cold water.

Alternatively, or additionally, cold water can be supplied before the brewing unit as part of a particularly gentle preparation process.

The cold water supplied can be additionally cooled internally in the machine by a first cooling device, so that the cold water supplied to the hot beverage can be colder than the water supplied to the automatic beverage maker. Peltier cooling and/or indirect cooling is may be used for cold water cooling.

The temperature of the cold water can be determined before it is added to the caffeinated hot beverage or to the water supplied to a brewing unit for the production of the caffeinated hot beverage, and the control of the amount of cold water added can be carried out as a function of the temperature determined. This option offers a more advanced and even more precise metering of the cold water.

The caffeinated hot beverage can also be cooled in a second cooling device after the addition of cold water in order to achieve a final temperature. It is clear that the addition of cold water changes the strength or concentration of the hot beverage. Therefore, in the case of some beverages, the metering of cold water can only be carried out up to an upper limit of cold water. The target temperature for dispensing the hot beverage can also be set in this case by the second cooling device, which can be designed as a heat exchanger. It is understood that any other beverage can also be fine-tuned with regard to temperature by means of aftercooling, provided that this is not already achieved via the cold water supply.

The measurement of the temperature of the caffeinated hot beverage in accordance with the invention can be carried out after adding cold water and passing the caffeinated hot beverage through that of the second cooling device.

Alternatively, or in addition, the temperature of the caffeinated hot beverage can also be measured before adding cold water.

It may be energy-saving, constructively advantageous and water-saving, if part of the cold water, especially the cooled cooling water, can be used to operate the second cooling device.

In addition, the part of the cold water for operating the second cooling device can be partially or completely returned to the cold water upstream of the first cooling device.

The throttle valve is used to precisely adjust the temperature by metering the cold water flow. An electrically adjustable throttle valve which limits the flow rate, especially an electrically adjustable motor-driven throttle valve which limits the flow rate may be used as a throttle valve. It is understood that the valve can also be mass-flow limited. If the viscosity is known, the conversion is possible without further ado.

It is also possible to homogenize a mixture of the caffeinated hot beverage and cold water before measuring the temperature, especially by using a homogenizer, to ensure optimal thorough mixing and heat energy transfer.

As already mentioned above, the desired value for the metering of the cold water, the pre-cooling of the cold water and especially the target temperature after aftercooling at the outlet can be assigned product-specifically by a second cooling device, according to the product selected by the user. For this purpose, in a manner known per se, the automatic beverage maker can have a control and/or evaluation unit with a CPU and a data memory, wherein corresponding product-specific data records, e.g. temperatures, volumes, etc., are stored on the data memory at various points in the process or in the automatic beverage maker. These data records can also be device-specific at the same time, depending on the device type.

It is also be possible to continuously correct the mixing temperature during the brewing process when preparing the caffeinated hot beverage. This can be carried out, for example, by measuring the temperature after aftercooling and making a corresponding readjustment after an actual/desired value adjustment.

The hot water volume and/or mass flow supplied to the brewing unit and the cold water volume and/or mass flow can be determined to optimize the discharge characteristics.

Cooling, both direct cooling and aftercooling, can be carried out using temperature curves and/or profiles, i.e. temperature measurement taking into account the course of time. Corresponding temperature curves and/or profiles can be stored as desired value data records.

The cold water can be supplied to the second cooling device before being supplied directly into the caffeinated hot beverage or into the water supplied to the brewing unit for the production of the caffeinated hot beverage in an indirect cooling of the caffeinated hot beverage with supplied cold water quantity.

The automatic beverage maker can have at least two operating modes, wherein in a first operating mode the cooling of the caffeinated hot beverage or of the water supplied to the brewing unit for the production of the caffeinated hot beverage is effected directly by means of a machine-controlled addition of cold water, and wherein in a second operating mode a caffeinated hot beverage is dispensed without cooling by machine-controlled addition of cold water. Thus, the automatic beverage maker can be used variably for hot beverages and cooled hot beverages.

Cooling of the caffeinated hot beverage or the water supplied to the brewing unit for the production of the caffeinated hot beverage by direct supply via a machine-controlled addition of cold water can be carried out after indirect further cooling of the cold water supplied from outside for the cold water addition, which is carried out internally within the machine.

The supply of cold water as direct cooling can be carried out after direct or indirect (further machine-internal) cooling of the cold water, in particular by the first cooling device, or before indirect cooling of the caffeinated hot beverage, in particular by the second cooling device.

An automatic beverage maker according to the invention for the preparation of a caffeinated hot beverage may be designed to carry out a method according to the invention. The caffeinated hot beverage is dispensed in particular with a defined dispensing temperature. The temperature can be measured and adjusted to a specified desired value. The desired value can be set by the user, for example, or specified according to the type of beverage selected by the user.

Such an automatic beverage maker may comprise a water inlet, a hot water line and a cold water line, a boiler for heating and/or providing hot water in the hot water line, a brewing unit for providing the caffeinated hot beverage in the hot water line and a dispensing device at the end of the hot water line for dispensing the caffeinated hot beverage from the automatic beverage maker. The hot water line has a cold water supply line for feeding cold water into the hot water upstream of the brewing unit or for feeding cold water into the prepared caffeinated hot beverage, wherein the automatic beverage maker may have a temperature sensor for determining a temperature of the caffeinated hot beverage after it has been prepared by the brewing unit for determining the temperature in or directly upstream of the dispensing unit, wherein the cold water is added as a function of the temperature determined by the temperature sensor.

In this context, direct means that there is no longer any direct and/or indirect cooling of the hot beverage between the temperature sensor and the dispensing unit, apart from the usual unwanted heat loss in the pipes.

By placing the temperature sensor in the area of the dispensing unit, a very precise temperature adjustment is possible, e.g. by readjusting individual cooling systems, e.g. direct cooling or indirect cooling.

The automatic beverage maker can be equipped with a homogenizer, which is arranged downstream of the cold water supply line.

Furthermore, the automatic beverage maker can have a second cooling device for indirect cooling of the caffeinated hot beverage, which is arranged downstream of the cold water supply line, and possibly downstream of the homogenizer.

Furthermore, the automatic beverage maker can be equipped with a first cooling device for pre-cooling the cold water before it is fed into the hot water upstream of the brewing unit or for feeding cold water into the caffeinated hot beverage.

In addition to the temperature sensor for determining a temperature of the caffeinated hot beverage in or immediately in front of the dispensing unit, the automatic beverage maker can have a temperature sensor for adjusting the cold water temperature by the first cooling device.

In addition or as an alternative to the above-mentioned temperature sensor for cold water temperature adjustment, the automatic beverage maker can also have a temperature sensor for determining the temperature of the prepared uncooled caffeinated hot beverage, which is arranged downstream of the brewing unit and upstream of a cooling supply line for feeding cold water into the prepared caffeinated hot beverage.

The automatic beverage maker may have a flow meter which is arranged in the hot water line. This can be used to determine the amount of water supplied to the boiler and/or the brewing unit.

The automatic beverage maker can additionally or alternatively have a flow meter, which is located in the cold water line. This can be used to determine the quantity of cold water supplied to the second cooling device and/or the quantity of cold water supplied to the hot water upstream of the brewing unit or to supply cold water to the caffeinated hot beverage.

The flow of cold water within the automatic beverage maker can be implemented so that the cold water can be pre-cooled by the first cooling device, can be fed to the second cooling device as a cooling medium for aftercooling the caffeinated hot beverage to which cold water has been applied and can then be introduced into an uncooled caffeinated hot beverage.

DESCRIPTION OF THE DRAWINGS

In the following, the invention is explained in more detail in several embodiments on the basis of the accompanying figures, wherein the invention is not limited to the concretely represented embodiments, wherein.

DETAILED DESCRIPTION

Figure 1:
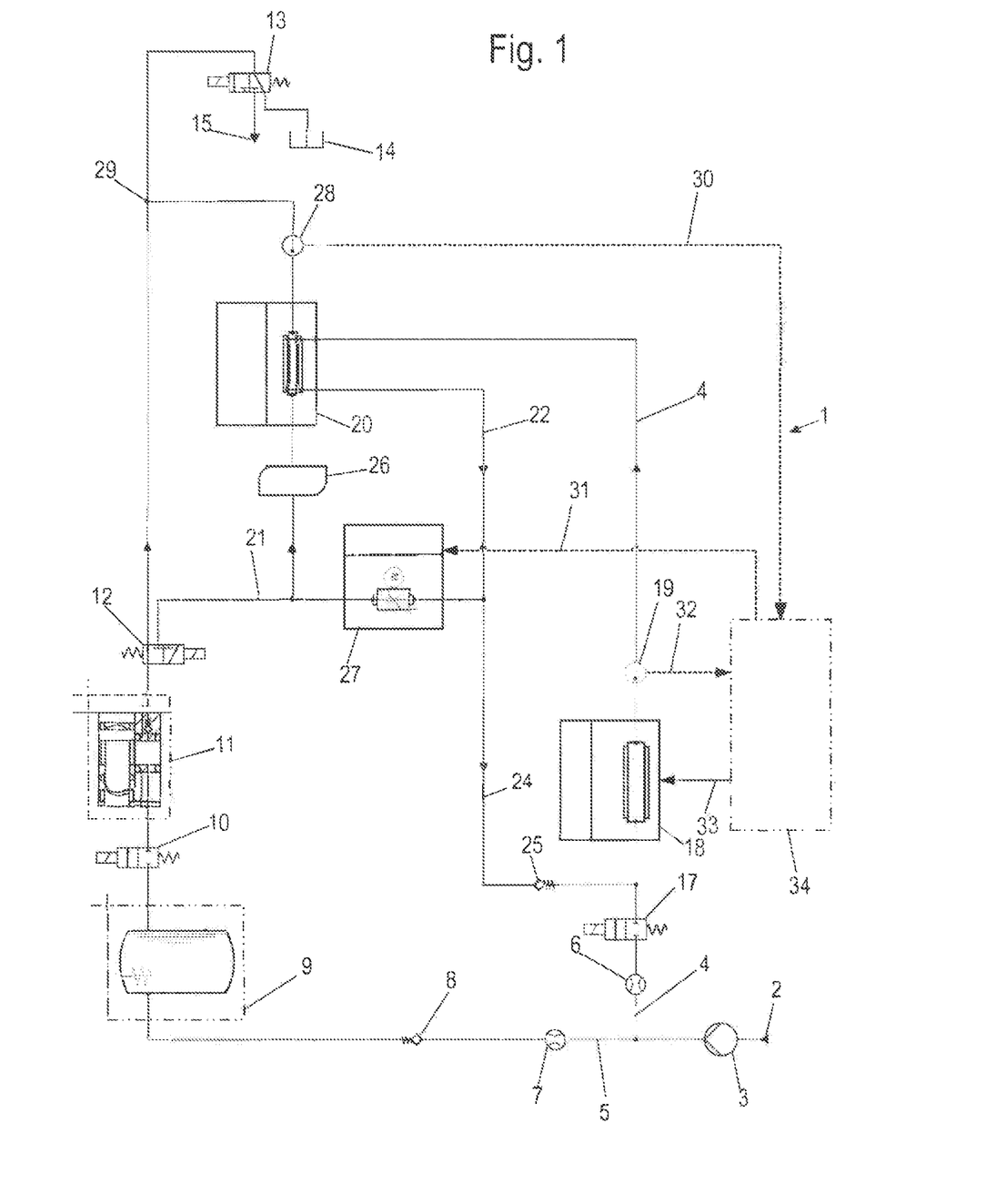
FIG. 1 shows a schematic representation of a first embodiment of an automatic beverage maker according to the invention with regulated cold water supply into a caffeinated hot beverage.

FIG. 1 shows a first embodiment of an automatic beverage maker 1 according to the present invention. This embodiment includes several options for cooling the caffeinated hot beverage and the cold water supplied before it is fed to the hot beverage. These options can, of course, also be implemented separately in a plurality of other embodiments of the method, either analogously or in modified form.

The automatic beverage maker 1 is here designed as a fully automatic coffee maker. It has a water connection 2, which can be connected to a conventional water tap, a house pipe or similar.

A supply line extends from water connection 2. A pump 3 is arranged along the supply line, which delivers the water supplied to the automatic beverage maker 1 and/or applies pressure to it.

The supply line is then divided into a cold water line 4 and a hot water line 5, wherein the supply into both lines 4 and 5 is carried out by a flow meters 6 and 7 for monitoring the respective volume and/or mass flow in the respective line, i.e. the hot water and cold water lines. In FIG. 1, a respective flow meter 6 and 7 is arranged after the division of the supply line on the cold water line 4 or the hot water line 5.

In terms of flow, a non-return valve 8, in particular a spring-loaded non-return valve 8, is arranged along the hot water line 5 downstream of the flow meter 7. A boiler 9 is then arranged along the hot water line 5, which heats the supplied water to a temperature in the preferred range of 80° C. to 96° C.

In terms of flow, a directional control valve 10, preferably designed as a 2/2 directional control valve, is arranged downstream of boiler 9, in particular as an electrically operated 2/2 directional control valve with spring return, for transferring a discrete quantity of water to a brewing unit 11.

The directional control valve 10 can interact with a control and/or evaluation unit 34 of the automatic beverage maker or communicate wirelessly or by wire. Thus, depending on the beverage selected by the user, it is possible to supply defined less or more water to the brewing unit 11. For example, different amounts of water are required for coffees of different sizes.

Brewing unit 11 contains the ingredients for preparing the caffeinated hot beverage. This can preferably be ground coffee. The caffeinated hot beverage is therefore prepared in brewing unit 11 at a temperature typically above 70° C.

In terms of flow, valve 12 is arranged downstream of the brewing unit 11 as a directional control valve, preferably as a 3/2 directional control valve, in particular as an electrically operated 2/2 directional control valve with spring return, whereby part of the caffeinated hot beverage or the entire quantity of the caffeinated hot beverage can be directed into a secondary line 21 branching off the hot water line. The directional control valve 12 is switched by the control and/or evaluation unit 34, depending on the type of beverage and the beverage temperature selected by the user.

In terms of flow, a supply line 29 of cooled caffeinated hot beverage from the secondary line 21 is arranged downstream of directional control valve 12.

Finally, the uncooled or cooled caffeinated hot beverage can be transferred to a dispensing unit 13 comprising a directional control valve, preferably in form of a 3/2 directional control valve, in particular as an electrically operated 2/2 directional control valve with spring return, for dispensing 15 into a container, e.g. a cup or mug. Usually the dispensing unit 13 may have one or more additional lines 14.

In terms of flow, after the flow meter 6, a directional control valve 17 can be arranged along the cold water line 4, preferably as a 2/2 directional control valve, in particular as an electrically operated 2/2 directional control valve with spring return. This directional control valve 17 is used to control the quantity of water to be cooled and defines a cold water quantity. It can also be operated by the control and/or evaluation unit 34.

Downstream of directional control valve 17, a return line 24, returns cold water from a second cooling device 20 for indirect cooling of the caffeinated hot beverage. A non-return valve 25 is arranged along the return line 24, which ensures that the cold water from the cold water line 4 is not conducted in the wrong direction through the second cooling device 20, which can be designed as a heat exchanger.

The cold water with a temperature T1 is then passed through a first cooling device 18. This cooling device can preferably be used for indirect cooling of the cold water to a temperature T2, wherein T2 is lower than T1, preferably at least 2 Kelvin, more preferably at least 5 Kelvin. For example, a Peltier element or another type of cooling can be used for this purpose.

The present application makes a distinction between direct cooling, in which a cold medium is introduced into a warm medium, e.g. cold water into warm water, and indirect cooling, wherein cooling takes place without introducing a medium into another medium.

A temperature sensor 19 for determining the cold water temperature after the first cooling device 18 may be installed at the outlet of the first cooling device.

The temperature sensor 19 determines an actual value 32, which is passed on to the control and/or evaluation unit 34. The latter compares the actual value 32 with a value for the type of beverage selected and/or for the temperature of the beverage selected for the cold water quantity predefined by the valve 17 and determines a control signal 33 for setting the first cooling device 18, in particular the cooling capacity.

The cooled cold water with the temperature T2 is fed to the second cooling device 20 as cooling medium for indirect cooling of the caffeinated hot beverage. In the second cooling device 20, the cooling medium is fed in a separate cooling circuit, so that heat exchange takes place, but no mass transfers between the cooling medium and the caffeinated hot beverage.

After passing through the second cooling device 20, the cooling water can be dispensed to the uncooled caffeinated hot beverage via a metering valve 27 designed as a throttle valve, optionally with a quantity metering function. For this purpose, the metering valve 27 is arranged on a cold water outlet 22 leading away from the second cooling device 20, which enables a volume-metered supply of cold water from the cold water outlet 22 to the secondary line 21.

Furthermore, the cold water outlet 22 is connected to the return line 24, or it opens into this return line 24 along which the non-return valve 25, in particular a spring-loaded non-return valve, is arranged.

At the outlet of the second cooling device 20 a temperature sensor 28 is placed to determine the temperature of the cooled hot beverage as it is dispensed to the user. This temperature sensor 28 communicates with the control and/or evaluation unit 34 by transmitting a measuring signal 30, which is compared by means of an actual/desired value comparison for the selected beverage and the selected temperature, and a control signal 31 is transmitted to the metering valve 27 for transmitting the quantity of cold water in the uncooled caffeinated hot beverage. This defined quantity is then added. After the addition and before the second cooling device 20, a homogenizer 26 may be arranged for optimum mixing of the caffeinated hot beverage and the supplied water.

In the example shown in FIG. 1, the direct cold water supply to the uncooled caffeinated hot beverage is carried Gut after the brewing process in the brewing unit 11. Furthermore, after the cold water supply, the caffeinated hot beverage is indirectly after-cooled by the second cooling device 20.

The regulation of the cold water supply is carried out depending on the mixing temperature after the completed indirect aftercooling. Furthermore, the cold water is cooled by the first cooling device 18 before being fed into the uncooled caffeinated hot beverage.

FIG. 1 shows several options of cooling systems, whose position in the method or in the automatic beverage maker can vary and which can also be provided only optionally. These options are briefly discussed again below.

The cold water supply is carried out in FIG. 1 after the brewing operation in the brewing unit 11. Other positions of the cold water supply are also possible.

Machine-controlled addition of cold water in this respect means that it is controlled or regulated by the machine and thus initiated, either by a line inside the machine through which the water for preparing the hot beverage flows or through which the already prepared hot beverage flows, or through a separate outlet directly into the vessel into which the prepared hot beverage is dispensed (the last variant is not shown here).

Indirect aftercooling can be achieved by an optional second cooling device 20.

The regulation of the cold water supply is carried out depending on the mixing temperature, which is measured by temperature sensor 28. The temperature can also be measured at a different position. It is also possible to provide regulation of the system using a different temperature, e.g. the temperature of the hot and/or cold water before merging.

The supplied cold water is actively cooled by the optionally provided first cooling device 18.

Figure 2:
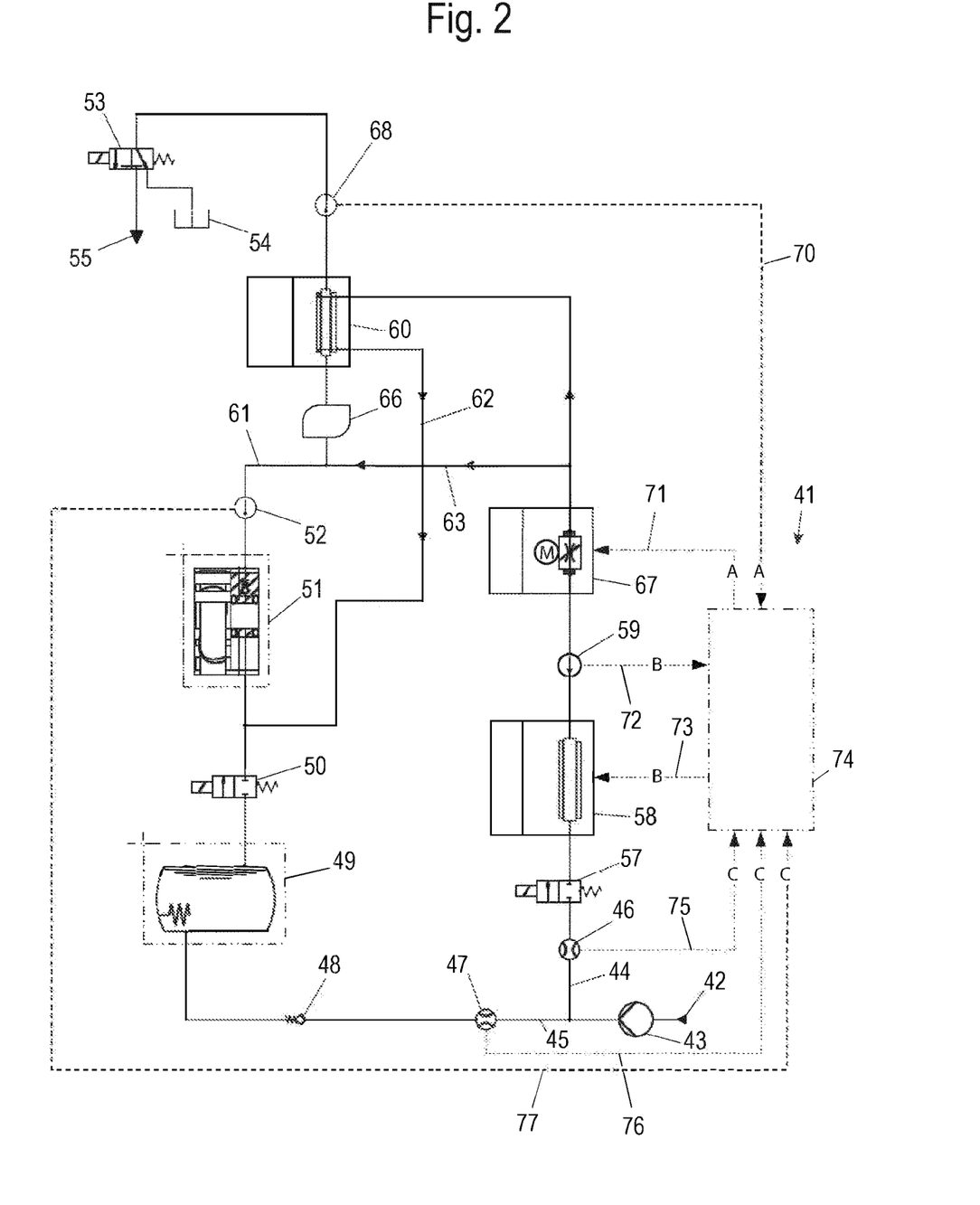
FIG. 2 shows a schematic representation of a second embodiment of an automatic beverage maker according to the invention with regulated cold water supply into a caffeinated hot beverage.

FIG. 2 shows a second embodiment of an automatic beverage maker 41 according to the present invention.

Similar to FIG. 1, it comprises a water connection 42 from which a supply line with a pump 43 extends. Similar to FIG. 1, the supply line is divided into a cold water line 44 and a hot water line 45 each with a flow meter 46, 47. The evaluation of the measuring signals of the flow meters 46, 47 for controlling the supply of water into the hot water and cold water lines, e. g. by corresponding valves or by the pump, is carried out by a control and/or evaluation unit 74.

In terms of flow, after the flow meter 47, a non-return valve 48, in particular a spring-loaded non-return valve, is arranged along the hot water line 45, followed by a boiler 49, which heats the supplied water to a temperature in the preferred range of 80° C. to 96° C.

Behind the boiler 49, a directional control valve 50 in a design similar to FIG. 1 is arranged to transfer a discrete quantity of water to a brewing unit 51. Between the control valve 50 and the brewing unit 51 a first supply line 62 of cold water, in the following also called cold water supply line, is arranged.

The function of the brewing unit 51 is already described in FIG. 1. The water supplied to the brewing unit 51 can be set at a lower temperature than in FIG. 1.

A temperature sensor 52 is located in outlet line 61 of brewing unit 51 to determine the coffee temperature after the brewing unit 51. This temperature sensor 52, in combination with the flow rates determined by the flow meters 46 and 47, serves to adjust the amount of cold water supplied to the hot and cold water lines, e.g. by adjusting individual valves, e.g. individual or several regulating or metering valves shown in FIG. 2, and/or the pump 43.

In the outlet 61 of the brewing unit, a second supply line 63 of cold water is arranged in terms of flow downstream of the temperature sensor 52.

A homogenizer 66 is arranged after the cold water supply line 63, followed by a second cooling device 60 for indirect aftercooling, especially of a caffeinated hot beverage already cooled by direct cooling.

After the second cooling device 60, a further temperature sensor 68 is arranged to determine the cooled caffeinated hot beverage to be dispensed.

Finally, the uncooled or cooled caffeinated hot beverage can be dispensed to a dispensing unit 53, with a 3/2 directional control valve analogous to FIG. 1 and, optionally, comprising further outlets 54.

After the flow meter 46, a directional control valve 57 in a design similar to FIG. 1 can be arranged along the cold water line 44, analogous to FIG. 1. Also the amount of cold water supplied can be determined by the control and/or evaluation unit 74 on the basis of the volume and/or mass flow determined by the flow meter 46 in combination with the determined temperature at the temperature sensor 52.

The cold water with a temperature T1 can then pass through a first cooling device 58, which cools the cold water down to a temperature T2 (T2<T1). The first cooling device 58 is set by a signal 73 from the control and/or evaluation unit 74, which compares a measuring signal 72 with another temperature sensor 59 downstream of the first cooling device 58 with a desired value.

Downstream of the further temperature sensor 59 is a metering valve 67 in the form of a throttle valve in analogous design to metering valve 27 in FIG. 1, which adjusts the quantity of the cold water supplied directly to the brewed caffeinated hot beverage. This is carried out depending on a measuring signal 70 of a mixing temperature determined by the temperature sensor 68 and a control signal 71 determined by the control and/or evaluation unit depending on the measuring signal 70 which is delivered to the throttle valve 67.

The quantity of cold water set by the metering valve 67 can be fed directly via a supply line 63 or feed line into the outlet 61 of the brewing unit 51.

Alternatively, the quantity of cold water set by the metering valve 67 can also be fed to the second cooling device 60 as a cooling medium and then fed to the hot water upstream of the brewing unit 51 via feeder 62 or the supply line.

As hot water within the terms of the present invention, the hot water can be in liquid form or also partly or completely in vapor form and be supplied from the boiler to the brewing unit.

The temperature measurement of the mixing temperature by the temperature sensor 68 at the outlet of the second cooling device 60 is used to control the metering valve 71 by means of an actual/desired value comparison.

The automatic beverage maker 41 allows cold water supply or the addition of cold water to the hot water before the brewing unit 51 and/or cold water supply or addition to the prepared caffeinated hot beverage after its provision in the brewing unit 51.

Indirect cooling of the hot beverage, which is already pre-cooled by direct cold water injection, can be switched on or off as required.

The regulation of the cold water supply can be carried out depending on the mixing temperature of the dispensed caffeinated hot beverage. There is also active cooling of the cold water depending on the temperature of the cold water at temperature sensor 59.

FIG. 2 shows several options of cooling systems, whose position in the method or in the automatic beverage maker can vary and which can also be provided only optionally. These options are briefly discussed again below.

In FIG. 2, the cold water is supplied either via line 63 after the brewing process in the brewing unit 51 or via line 62 before the brewing process in the brewing unit 51. It is also possible to have only one line 62 or 63 at a time.

Indirect aftercooling is provided by the second cooling device 60, which is only provided as an option.

The regulation of the cold water supply can be carried out depending on the mixing temperature, which is detected by the temperature sensor 68. Here too, the temperature can be measured at a different position. It is also possible to provide regulation by using a different temperature, e.g. the temperature of the hot and/or cold water before merging.

The supplied cold water is actively cooled by the optionally provided first cooling device 58. The cooling of the cold water can optionally be carried out in a controlled manner by the temperature sensor 59.

The temperature and the quantity of cold water can be determined alternatively or additionally by a measurement made at temperature sensor 52.

Figure 3:
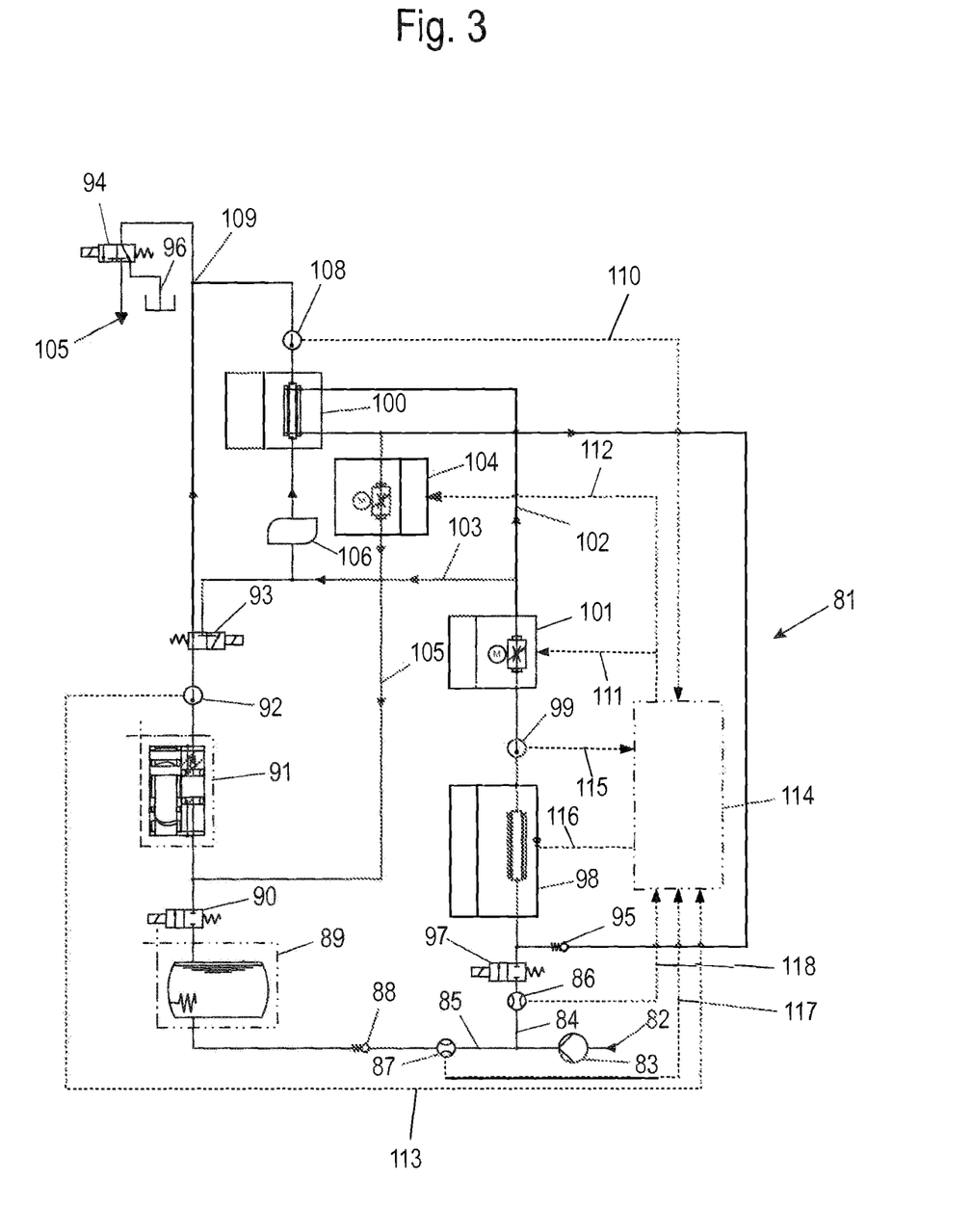
FIG. 3 shows a schematic representation of a third embodiment of an automatic beverage maker according to the invention with regulated cold water supply into a caffeinated hot beverage.

FIG. 3 shows a third embodiment of an automatic beverage maker 81 according to the invention with a water connection 82 from which a supply line with a pump 83 extends. After the pump 83 the supply line branches into a cold water line 84 and a hot water line 85. The supply quantity into the two aforementioned water lines is measured by a flow meter 86, 87 each and set by a control and/or evaluation unit 114.

The hot water line 85 has a non-return valve 88, analogous to FIGS. 1 and 2, followed by a boiler 89 and a directional control valve 90 in the outlet of the boiler 89, in the arrangement analogous to FIGS. 1 and 2. A first cold water supply line 105 is arranged between the directional control valve 90 and a downstream brewing unit 91. By means of the cold water supplied upstream of the brewing unit 91, the temperature of the water supplied to the brewing unit can be set to a lower temperature than the water provided by the boiler 89.

A temperature sensor 92 is located at the outlet of the brewing unit 91 to determine the coffee temperature after the brewing unit 91. This temperature sensor 92 is used in combination with the flow meters 86 and 87 to adjust the amount of cold water supplied to the hot and cold water lines.

In terms of flow, a directional control valve 93, preferably as a 3/2 directional control valve, in particular as an electrically operated 2/2 directional control valve with spring return, is arranged downstream of the temperature sensor 92, which enables the caffeinated hot beverage to be passed on directly to a dispensing unit 94 comprising a directional control valve, preferably a 3/2 directional control valve, and optionally further discharge lines, for the dispensing 105 of the caffeinated hot beverage.

Alternatively, the directional control valve 93 can divert the brewed quantity of caffeinated hot beverage to a secondary line. A direct feed 103 of cold water is made in this secondary line. For better mixing, the caffeinated hot beverage mixed with cold water can be fed to a homogenizer 106 and then to a second cooling device 100 for indirect aftercooling of the caffeinated hot beverage to a mixing temperature or target or dispensing temperature. A further temperature sensor 108 is arranged in the outlet of the second cooling device 100 for determining the output temperature of the caffeinated hot beverage, without taking into account the quantity of milk supplied through the supply line 96.

After the supply line has been split, the cold water line 84 has a flow meter 86 for controlling, for example, a directional control valve 97 arranged on the cold water line 84, which sends a measuring signal 118 to a control and/or evaluation unit 114. The control and/or evaluation unit 114 can adjust the directional control valve 97 on the basis of the measuring signal and, optionally, by taking into account the measuring signal 113 determined by the temperature sensor 92.

The same applies to the flow meter 87 of the hot water line 85, with which e.g. the capacity of the pump 83 and/or the opening degree of the directional control valve 90 can be adjusted. Here too, the measuring signal of the temperature sensor 92 can be taken into account.

The cold water with a temperature T1 can then be passed through a first cooling device 98, whereby the cold water is cooled down to a temperature T2 (T2<T1). The first cooling device 98 is set by a signal 116 from the control and/or evaluation unit 114, which compares a measuring signal 115 from another temperature sensor 99 downstream of the first cooling device 98 with a desired value.

Downstream of the further temperature sensor 99 is a first metering valve 101 as a throttle valve, which adjusts the amount of cold water supplied to the brewed caffeinated hot beverage directly via a cold water supply line after the brewing unit 91. Optionally, the cold water from the metering valve 101 can be fed as a cooling medium via a cooling medium supply line 102 to the second cooling unit 100.

In the cooling medium outlet of the second cooling device 100 a second metering valve 104 is arranged as a throttle valve, which feeds cold water via a supply line 105 to the hot water line 85 before the brewing unit 91 after passing through the cooling device 100.

Alternatively, the cooling medium of the second cooling device 100 can be discharged through a return line 96 before the first cooling device 98. A non-return valve 95 is preferably arranged along this return line 96.

Both the signals 111 and 112 for setting the first metering valve 101 and the second metering valve 104 are generated by a control and/or evaluation unit 114 as a function of a measuring signal 110 from the temperature sensor 108 to determine the target or output temperature of the caffeinated hot beverage.

The control of the first cooling device 98 via the control signal 116 can be carried out analogously to FIG. 1 or 2.

FIG. 3 shows several options of cooling systems, whose position in the method or in the automatic beverage maker can vary and which can also be provided only optionally. These options are briefly discussed again below.

In FIG. 3, the cold water is supplied either via line 103 after the brewing operation in the brewing unit 91 or via line 105 before the brewing operation in the brewing unit 91. It is also possible to provide only one line 103 or 105 at a time.

Indirect aftercooling is provided by the second cooling device 100, which is only provided as an option.

The regulation of the cold water supply can be carried out depending on the mixing temperature, which is detected by the temperature sensor 99. Here too, the temperature can be measured at a different position. It is also possible to control the system using a different temperature, e.g. the temperature of the hot and/or cold water before merging.

The supplied cold water is actively cooled by the optionally provided first cooling device 98. The cooling of the cold water can optionally be controlled by the temperature sensor 99.

The temperature and/or the amount of cold water can be determined alternatively or additionally depending on a measurement which is made at temperature sensor 92.

In the embodiment of FIG. 3, the two metering valves 101 and 104 can be controlled by the control and/or evaluation unit 114 or optionally only one of the two metering valves.

Figure 4:
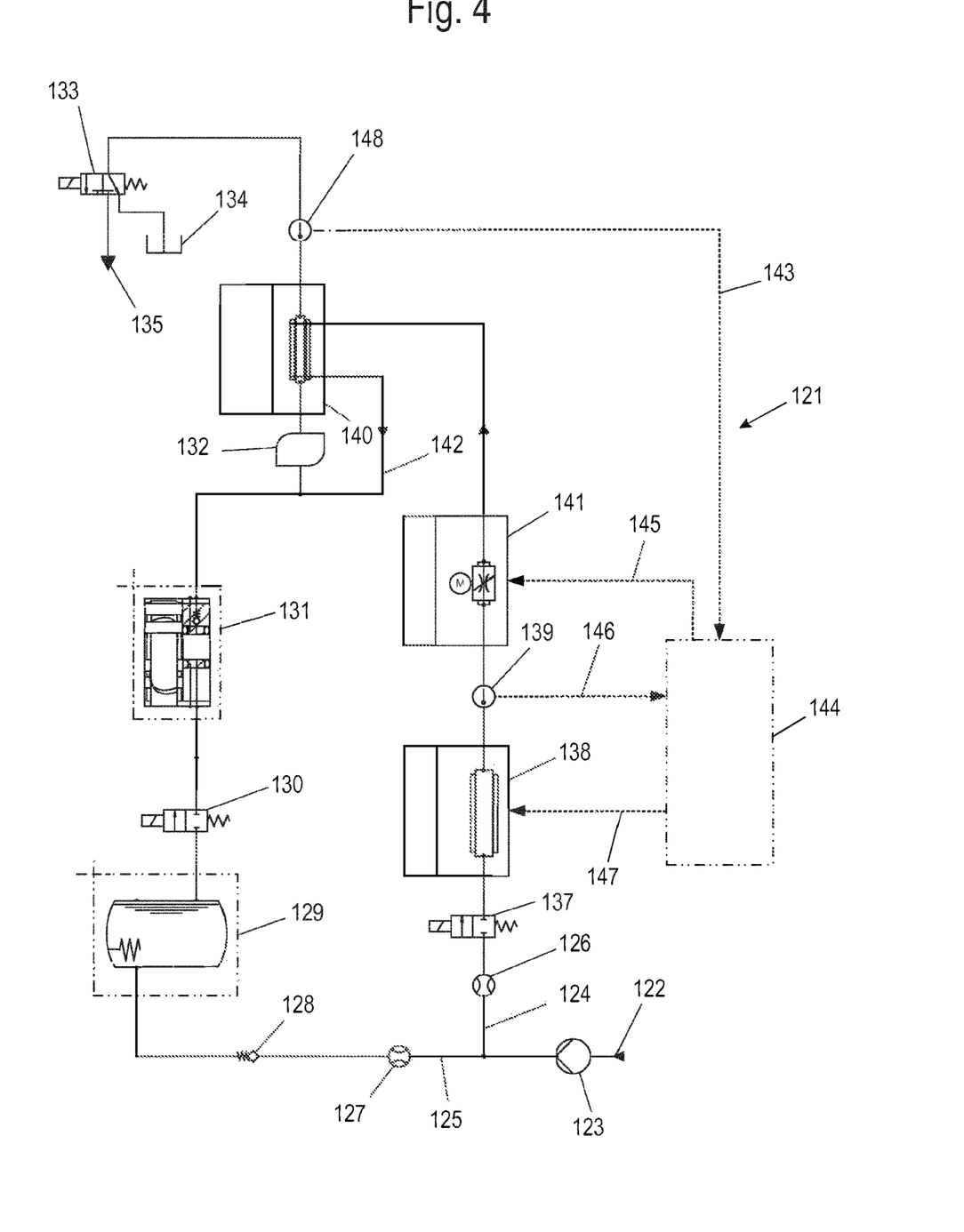
FIG. 4 shows a schematic representation of a further embodiment of an automatic beverage maker according to the invention.

FIG. 4 shows a fourth embodiment of an automatic beverage maker 121 according to the invention, which has a water connection 122 with a connecting supply line with a pump 123. The supply line then branches into a cold water line 124 and a hot water line 125, each with a flow meter 126, 127. Downstream of flow meter 127, a non-return valve 128 is arranged on the hot water line 125 analogously to FIGS. 1-3. Then, a boiler 129 is arranged on the hot water line 125. At the outlet of the boiler 129 a directional control valve 130 is arranged followed by a brewing unit 131. The function of the individual components is explained in detail in the exemplary embodiment in FIG. 1.

Cold water is then added to the brewed caffeinated hot beverage by direct supply via line 142 after passing through indirect cooling device 140. The cooled hot beverage is then passed through a homogenizer 132. This mixture is then passed through the second cooling device 140 and cooled. After passing through the second cooling device, the temperature of the cooled caffeinated hot beverage is determined by a temperature sensor 148. The measured value 143 is fed to a control and/or evaluation unit 144, which adjusts the temperature of the cold water supplied to the hot beverage accordingly.

The automatic beverage maker 121 has a dispensing unit 133 analogous to FIGS. 1-3 for dispensing 135 into a container. The dispensing unit 133 can have further outlets 134.

The cold water line 124 has a directional control valve 137, a first cooling device 138 and a temperature sensor 139 analogous to FIG. 1. The temperature sensor 139 is used to set the temperature of the cold water by means of the control and/or evaluation unit 144, by actual/desired value comparison of the measuring signal 146 of the temperature sensor 139. Subsequently, the control and/or evaluation unit 144 transmits a control signal to the first cooling device 138. In terms of flow, a metering valve 141 is arranged downstream of the temperature sensor 139 in the form of a throttle valve, which meters the quantity of cold water for supply to the second cooling device 140 and the subsequent quantity of cold water for direct supply to the caffeinated hot beverage via line 142. This metering valve 141 is controlled by a control signal 145 depending on the temperature of the temperature sensor 148.

The embodiment in FIG. 4 has a cold water supply after the brewing process and an optional aftercooling. The cold water supply depends on the mixing temperature. A likewise optional active cooling of the cold water is realized by the first cooling device 138.

Figure 5:
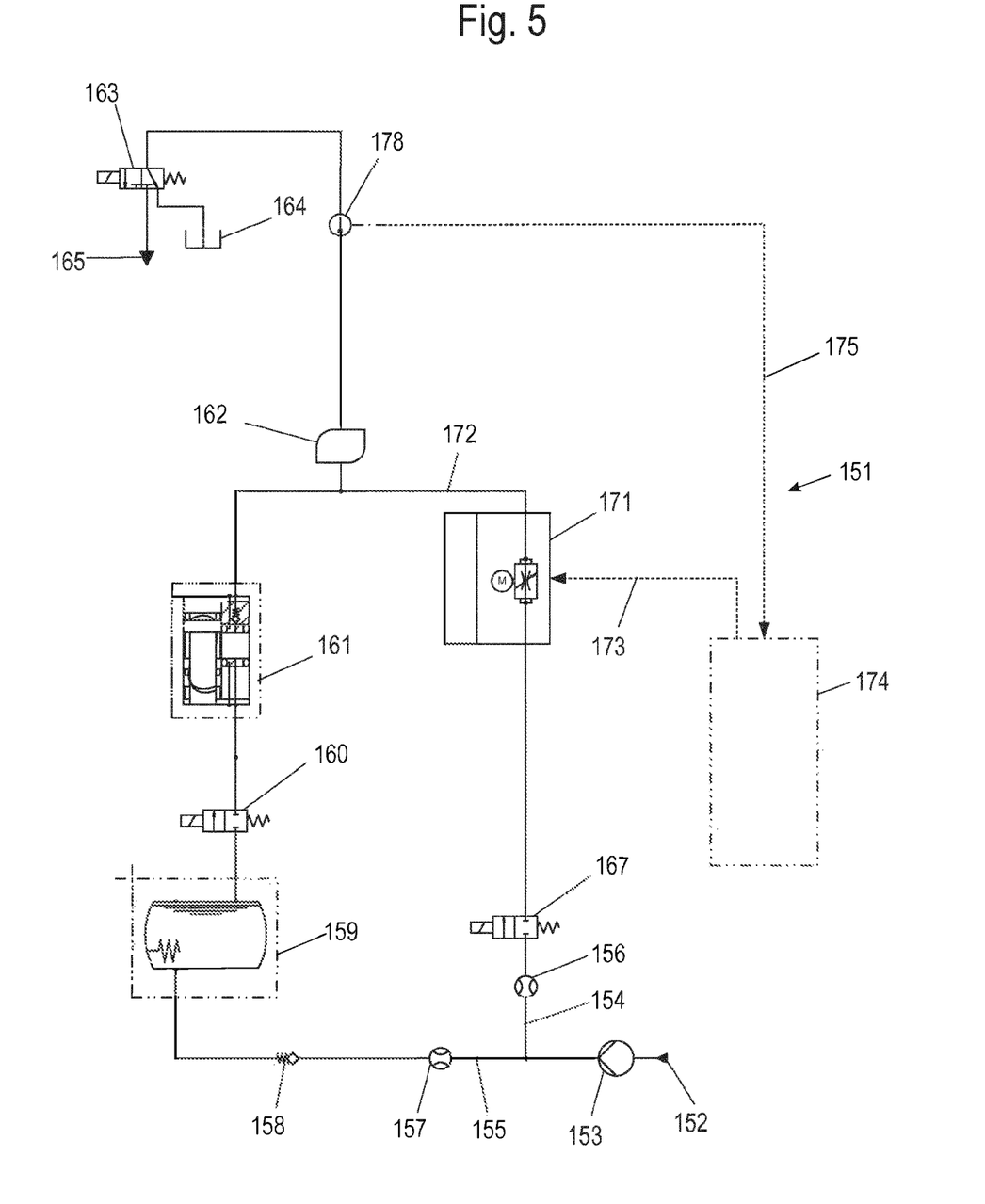
FIG. 5 shows a schematic representation of a fifth embodiment of an automatic beverage maker according to the invention.

FIG. 5 shows an automatic beverage dispenser 151 with a water connection 152, a pump 153, a cold water line 154 and a hot water line 155, each with a flow meter 156, 157. The hot water line 155 also has a non-return valve 158 analogous to FIGS. 1-4, a boiler 159, a directional control valve 160 and a brewing unit 161, which is used to prepare an uncooled caffeinated hot beverage.

Along the cold water line 154, there is a directional control valve 167 and a metering valve 171 designed as a throttle valve for measuring a specific amount of cold water for metering into the uncooled caffeinated hot beverage. This is carried out via a secondary line 172 into the outlet of the brewing unit 161. The cold water/hot beverage mixture can then be mixed in a homogenizer. The target or output temperature is then determined by a temperature sensor 178.

Dispensing 165 of the caffeinated hot beverage is carried out by a dispensing unit 163 comprising a directional control valve and, optionally, further outlets 164.

The temperature sensor 178 determines a measuring signal 175, transmits this to a control and/or evaluation unit 174 and passes a control signal 173 to the metering valve 171 for metering the directly supplied cold water quantity.

FIG. 5 shows an embodiment without indirect aftercooling after the addition of cold water.

Figure 6:
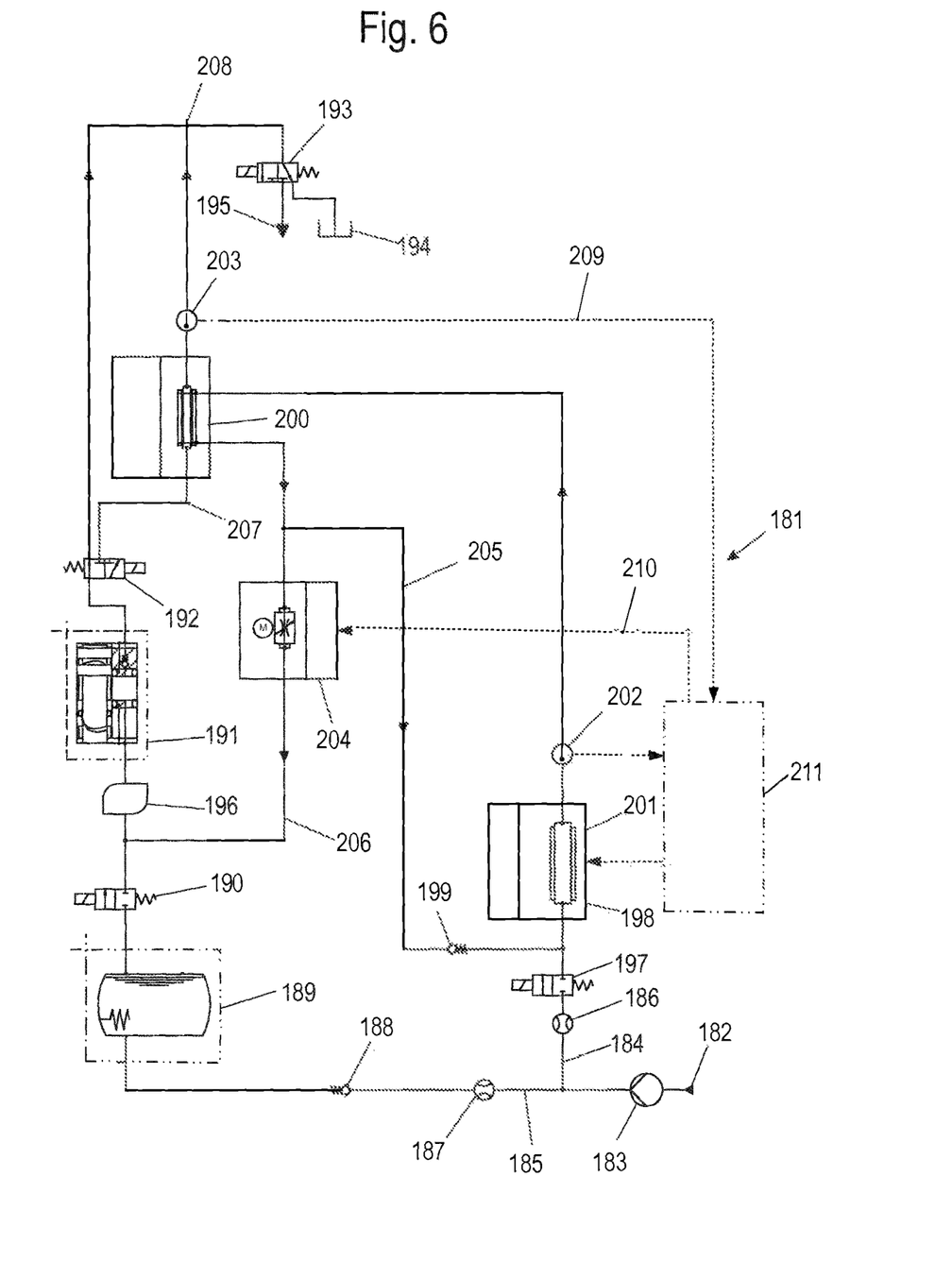
FIG. 6 shows a schematic representation of a sixth embodiment of an automatic beverage maker according to the invention.

FIG. 6 shows another embodiment of an automatic beverage maker 181 with a water connection 182, a pump 183, a cold water line 184 and a hot water line 185, each with a flow meter 186, 187. The hot water line 185 also has a non-return valve 188 analogous to FIGS. 1-5, a boiler 189, a directional control valve 190, in analogous design of FIGS. 1-4, followed by a cold water supply line 206 upstream of a brewing unit 191 and a homogenizer 196 upstream of the brewing unit 191.

A directional control valve 192, preferably a 3/2 directional control valve, is arranged in the outlet of the brewing unit for feeding the hot beverage enriched with cold water to a second cooling device 200 for indirect aftercooling or for direct feeding of the hot beverage without indirect aftercooling to an dispensing unit 193 comprising optional further outlets 194 and a directional control valve. In this unit the dispensing 195 of hot beverage takes place.

In terms of flow, the second cooling device 200 is followed or arranged downstream of a temperature sensor 203, which determines a measuring signal 209 of the cooled hot beverage and transmits this to a control and/or evaluation unit 211.

Along the cold water line 184 there is a directional control valve 197, a return line 205 of cooling water from the second cooling device 200 with a non-return valve 199, a downstream first cooling device 198 with a downstream sensor 202 and a controller of the first cooling device analogous to the embodiment variant of FIGS. 1-5. The cold water is passed as cooling medium through the second cooling device 200 and then either fed to the return line 205 or via a metering valve 204, designed as a throttle valve, to the supply line 206, which is supplied by a control signal 206 depending on a measuring signal 209 of the temperature sensor 203.

Individual embodiments of the methods according to the invention with automatic beverage makers according to FIGS. 1-6 are described below as follows:

After brewing, the temperature is measured before the caffeinated hot beverage is dispensed and after indirect aftercooling by the second cooling device. In FIGS. 1-6, cooling is achieved by indirect aftercooling through the second cooling device and by direct cooling by supplying cold water via at least one metering valve.

The opening of the preferably electrically adjustable metering valve and thus the supplied cold water quantity is controlled depending on the stored desired temperature or target temperature or output temperature after the last cooling. On the basis of the resulting mixing temperature measurement after indirect aftercooling, continuous monitoring is carried out by the corresponding temperature sensor and a correspondingly adapted cold water supply.

In the variants in FIGS. 1-4 and 6, the temperature of the cold water supplied is stabilized at a low level by "pre-cooling" using a first cooling device. Such pre-cooling enables the system to compensate for temperature fluctuations of the cold water used and thus to balance out fluctuations in the line and/or ambient temperature.

Furthermore, pre-cooling enables the optimum setting of the mixing temperature or the output temperature of the caffeinated hot beverage, because the lower the temperature of the supplied water, the lower the desired value range of the mixing temperature can be set. The lower the temperature of the supplied water, the less cold water is required to reach the target range of the mixing temperature. This means that a particularly highly concentrated hot beverage containing caffeine can be made available to the user.

Such a pre-cooling of the cold water can be realized by a storage or continuous flow cooler and can be operated electrically or by water or cooling medium. A line area cooled by a Peltier element is considered particularly advantageous.

Preferably, the temperature of the cold water is measured after and/or in the water cooling system, especially after and/or in the first cooling device. Preferably, depending on the measured temperature, the cooling of the cold water is controlled and/or adjusted by a control and/or evaluation unit.

Alternatively or additionally, it is possible to measure the temperature of the brewed caffeinated hot beverage after the brewing unit, but before further cooling, and to calculate and set the amount of cold water required to reach the specified mixing temperature. This embodiment is realized, among others, in FIGS. 2 and 3 by setting the valves of the hot water and cold water lines under consideration of the flow rate in the respective line. However, other variants of setting are also conceivable, e. g. by setting one or more metering valves. The quantities can be monitored and adjusted by measuring the flow rate, e.g. using impeller meters or electromagnetic flowmeters.

In combination with a control and/or evaluation unit, the metering valve or metering valves enable the volume flows to be adjusted for optimum mixing of the brewed coffee with the cold water and to ensure uniform discharge characteristics.

As shown in FIGS. 1-6, the embodiments of the concept can be used in different combinations as well as independently of each other.

Furthermore, FIGS. 1-6 show different embodiments for a controlled addition of cold water to a caffeinated hot beverage within an automatic beverage maker.

Preferably, the hot water/cold water mixture can be fed to a homogenizer before the evaluating temperature measurement before or in the dispensing unit, so that an optimal mixing and heat energy transfer can be ensured by homogenization.

The cold water can be advantageously passed through an indirect heat exchanger, in particular the aforementioned second cooling device, before being fed directly into the caffeinated hot beverage.

The mixture, e.g. the coffee-cold water mixture, is passed through this heat exchanger to further reduce the temperature of the mixture.

Furthermore, cold water can be supplied before and/or after the brewing process, as can be seen from the different embodiments in FIGS. 1-6. Individual process steps and flow guides of FIGS. 1-6 can also be transferred to other embodiment variants.

Preferably, the brewed coffee can, via a valve behind the brewing unit in the flow direction, either be sent directly to the dispensing unit or be fed into the cooling system with the cold water supply and, if necessary, the first and/or second cooling device. The direct supply line with bypassing of the cooling system is advantageous in order not to unnecessarily lower the temperature of a coffee beverage that does not need to be cooled. Preferably, the metering unit can be arranged in an indirect aftercooling, preferably after the cooling, preferably at the intersection between the hot water line and the secondary line.

If the metering unit is arranged directly before the supply of cold water to the caffeinated hot beverage, cold water should preferably be returned to the cooling circuit, in particular before the first cooling device, in order to supply a proportionate quantity of cold water, adjustable via the metering valve, to the coffee over the entire reference time and in this process to continue to flow through the indirect aftercooling system.

At the beginning of the production of the caffeinated hot beverage, a data record specific to the hot beverage, which comprises water quantities (beverage size), mixing ratio (coffee concentration), water temperatures and/or target temperature, is provided by the control and/or evaluation unit based on the selection of the type of hot beverage by the user.

In the following, an embodiment of a method for the production of a caffeinated hot beverage is described by way of example with reference to the figures, in particular FIG. 2:

In a first step, cold water can be pumped through the cooling system with the pump and led into a drain until the temperature of the first measuring point of the temperature measurement after aftercooling is approximately the same as the temperature of the measuring point in the cold water line, which measuring point is downstream of a pre-cooling of the cold water. This step serves to dispose of the hot water from the pipes and to pre-cool the lines and components of the automatic beverage maker.

The brewing process can be started in a second step. Here, the brewed caffeinated hot beverage, e.g. hot coffee, is fed to the second cooling device optionally via a valve and in parallel cold water is fed to the coffee from a cold water supply line. The supply is carried out depending on the measured temperature after aftercooling by the second cooling device in conjunction with the cold water temperature, which is determined after the first cooling device, or in the absence of such a cooling device, in the cold water line. This can preferably be a so-called readjustment, provided that the temperature measured after aftercooling exceeds a desired value.

In a third step, the cold water volume flow can be controlled via the metering valve and, if necessary, e.g. in the event of a deviation from the desired value, the temperature of the cold water in the cold water cooling system and/or the supplied water quantities can be adjusted.

Cooled cold water which is not fed into the coffee by the volume flow and/or mass flow control of the metering valve can be fed back into the cold water line or cold water system via the return pipe in a fourth step. This creates a cooling circuit that improves the efficiency of the water cooling system and ensures the flow of indirect aftercooling, even with small direct additions to the coffee.

The coffee-cold water mixture can be homogenized in a further step after the cold water has been added to ensure optimum mixing and heat energy transfer.

In a subsequent step to homogenization, the cooled coffee can be passed through indirect aftercooling, which further reduces the temperature by heat transfer with a cooling medium in the form of indirect cooling.

Finally the coffee can be dispensed.

The invention claimed is:

1. A method for adjusting a desired dispensing temperature of a hot beverage from an automatic beverage maker, comprising the following steps:
providing hot water by a boiler;
providing the hot beverage by a brewing unit supplied with the hot water from the boiler;
measuring a temperature of the hot beverage output from the brewing unit to produce a first measured temperature;
comparing the first measured temperature with the desired dispensing temperature of the hot beverage;
adjusting the first measured temperature of the hot beverage to the desired dispensing temperature by cooling, that is effected at least partially by a machine-controlled addition of cold water using a controllable metering valve for metering an amount of cold water supplied to the hot beverage provided by the brewing unit or to the hot water supplied to the brewing unit; and
before the cold water is supplied to the hot beverage output from the brewing unit or to the water supplied to the brewing unit, measuring a temperature of the cold water to produce a second measured temperature; and
carrying out the adjusting step by the metering the amount of cold water supplied by the controllable metering valve as a function of the second measured temperature.

2. The method according to claim 1, wherein the step of measuring the temperature of the hot beverage is carried out after supplying the cold water, and the metering of the amount of cold water is additionally carried out as a function of the first measured temperature.

3. The method according to claim 1, wherein the metering the amount of cold water is carried out downstream of the brewing unit.

4. The method according to claim 1, wherein the metering the amount of cold water is carried out upstream of the brewing unit.

5. The method according to claim 1, including cold water received from a water inlet connection using a first cooling device which furnishes further cooled cold water to the controllable metering valve for metering the amount of cold water.

6. The method according to claim 1, wherein the measuring of the temperature is carried out before the water is supplied.

7. The method according to claim 1, including using a throttle valve as the controllable metering valve.

8. The method according to claim 7, including using an electrically adjustable throttle valve which limits at least one of volume flow and mass flow, as the throttle valve.

9. The method according to claim 1, including determining and assigning the desired dispensing temperature in a product-individual manner, according to a product selected by a user.

10. The method according to claim 1, including continuously correcting a mixing temperature of the cold water supplied in the metering step during a preparation of the hot beverage in the brewing unit.

11. The method according to claim 1, including arranging the controllable metering valve in a cold water line coupled to a water inlet connection and arranging the boiler in a hot water line coupled to the water inlet connection; determining a flow rate of water in at least one of the hot and cold water lines; and optimizing discharge properties of the hot beverage dispensed by the automatic beverage maker based in part on at least one of the flow rates.

12. The method according to claim 1, including carrying out the cooling using temperature curves and/or profiles.

13. The method according to claim 1, wherein the method further includes operating the automatic beverage maker in an operating mode that includes dispensing hot beverage without cooling by the machine-controlled addition of cold water.

14. The method according to claim 1, further including carrying out the cooling of the hot beverage or of the water supplied to the brewing unit for production of the hot beverage directly via the machine-controlled addition of cold water after cooling of the supplied cold water.

15. A method for adjusting a desired dispensing temperature of a hot beverage from an automatic beverage maker, comprising the following steps:
providing hot water by a boiler;
providing the hot beverage by a brewing unit supplied with the hot water from the boiler;
measuring a temperature of the hot beverage output from the brewing unit to produce a first measured temperature;
comparing the first measured temperature with the desired dispensing temperature of the hot beverage;
adjusting the first measured temperature of the hot beverage to the desired dispensing temperature by direct cooling that is effected at least partially using a controllable metering valve to supply a metered amount of cold water to the hot beverage provided by the brewing unit or to the hot water supplied to the brewing unit;
cooling the cold water received from a water inlet connection using a first cooling device which furnishes cooled cold water to the controllable metering valve for metering the amount of cold water; and
cooling the hot beverage in a second cooling device by indirect cooling after the metered amount of cold water is supplied.

16. The method according to claim 15, further including using a part of the cooled cold water from the first cooling device for operating the second cooling device.

17. The method according to claim 15, wherein the step of measuring of the temperature of the hot beverage is carried out downstream of the second cooling device.

18. The method according to claim 16, including recirculating a part of the cold water for operating the second cooling device into the cold water upstream of the first cooling device.

19. The method according to claim 15, including supplying the cold water from the metering step to the second cooling device for effecting an indirect cooling of the hot beverage with the supplied amount of cold water before being fed directly into the hot beverage or before being fed into the brewing unit.

20. The method according to claim 15, further including carrying out the supplying of cold water by the direct cooling after cooling of the cold water or before indirect cooling of the hot beverage by the second cooling device.

21. A method for adjusting a desired dispensing temperature of a hot beverage from an automatic beverage maker, comprising the following steps:
providing hot water by a boiler;
providing the hot beverage by a brewing unit supplied with the hot water from the boiler;
measuring a temperature of the hot beverage output from the brewing unit;
comparing the measured temperature with the desired dispensing temperature of the hot beverage;
adjusting the first measured temperature of the hot beverage to the desired dispensing temperature by cooling that is effected at least partially using a controllable metering valve to supply a metered amount of cold water to the hot beverage provided by the brewing unit or to the hot water supplied to the brewing unit; and
homogenizing a mixture of the hot beverage and cold water before the measuring of the temperature.

22. An automatic beverage maker for preparing a hot beverage, comprising:
a water inlet;
a hot water and a cold water line coupled to the water inlet;
a boiler arranged for providing hot water in the hot water line;
a brewing unit coupled to an output of the boiler for providing the hot beverage in the hot water line;
a dispensing unit coupled to the brewing unit and disposed at an end of the hot water line for dispensing the hot beverage from the automatic beverage maker;
at least one cold water supply line for feeding cold water into the hot water line upstream of the brewing unit or for feeding cold water into the hot beverage after it has been made available by the brewing unit;
at least one temperature sensor arranged for determining a temperature of the hot beverage;
a cold water supply coupled to the cold water line;
a controllable metering valve coupled to the cold water supply to provide a metered addition of the cold water as a liquid medium into the cold water supply line as a function of the temperature determined by the temperature sensor in order to adjust the temperature of the hot beverage; and
an homogenizer arranged to mix hot beverage from the brewing unit and cold water from the cold water line.

23. The automatic beverage maker according to claim 22, wherein the at least one temperature sensor is arranged in or directly in front of the dispensing unit.

24. The automatic beverage maker according to claim 22, wherein the cold water supply includes a first cooling device coupled to the cold water line to cool water received from the water inlet for pre-cooling water before being fed into the hot water upstream of the brewing unit or for feeding cold water into the hot beverage downstream of the brewing unit; and a second cooling device for indirect cooling of the hot beverage arranged after the homogenizer-.

25. The automatic beverage maker according to claim 22, wherein the cold water supply includes a first cooling device for pre-cooling the cold water before it is fed into the hot water upstream of the brewing unit or for feeding cold water into the hot beverage downstream of the brewing unit.

26. The automatic beverage maker according to claim 22, further including a further temperature sensor for sensing a temperature of cold water output from the first cooling device.

27. The automatic beverage maker according to claim 22, further including another temperature sensor, arranged downstream of the brewing unit and upstream of the cold water for supplying cold water into the hot beverage, to determine a temperature of uncooled hot beverage.

28. The automatic beverage maker according to claim 22, further comprising a flow meter arranged in the hot water line.

29. The automatic beverage maker according to claim 22, further comprising a flow meter arranged in the cold water line.

30. The automatic beverage maker according to claim 25, further comprising a second cooling device, wherein a flow guidance of the cold water within the automatic beverage maker is realized so that cold water is pre-cooled by the first cooling device and fed to the second cooling device as a cooling medium for aftercooling the hot beverage to which cold water has been applied and for subsequently being introduced into an uncooled hot beverage.

* * * * *

UNITED STATES PATENT AND TRADEMARK OFFICE
CERTIFICATE OF CORRECTION

PATENT NO. : 11,925,289 B2
APPLICATION NO. : 17/054498
DATED : March 12, 2024
INVENTOR(S) : Bernd Buchholz et al.

It is certified that error appears in the above-identified patent and that said Letters Patent is hereby corrected as shown below:

In the Claims

Please correct Claims 5, 6 and 27 to read as follows:

5. The method according to claim 1, including cooling cold water received from a water inlet connection using a first cooling device which furnishes cooled cold water to the controllable metering valve for metering the amount of cold water.

6. The method according to claim 1, wherein the measuring of the temperature is carried out before the cold water is supplied.

27. The automatic beverage maker according to claim 22, further including another temperature sensor, arranged downstream of the brewing unit and upstream of the cold water supply for supplying cold water into the hot beverage, to determine a temperature of uncooled hot beverage.

Signed and Sealed this
Second Day of July, 2024

*Katherine Kelly Vidal*

Katherine Kelly Vidal
*Director of the United States Patent and Trademark Office*